United States Patent [19]
Baker

[11] Patent Number: 6,061,336
[45] Date of Patent: May 9, 2000

[54] POLARIZATION ENHANCED CDMA COMMUNICATION SYSTEM

[75] Inventor: Kenneth R. Baker, Boulder, Colo.

[73] Assignee: Qualcomm Incorporated, San Diego, Calif.

[21] Appl. No.: 08/941,147

[22] Filed: Sep. 30, 1997

[51] Int. Cl.[7] .................................................. H04B 7/216
[52] U.S. Cl. .......................... 370/320; 370/335; 370/342
[58] Field of Search .................................. 370/320, 335, 370/342; 455/101, 102, 103, 504, 506, 132, 137, 139, 277.1, 275

[56] References Cited

U.S. PATENT DOCUMENTS

| | | | |
|---|---|---|---|
| 4,901,307 | 2/1990 | Gilhousen et al. | 370/18 |
| 5,533,011 | 7/1996 | Dean et al. | 370/18 |
| 5,581,707 | 12/1996 | Kuecken | 395/200.13 |
| 5,584,057 | 12/1996 | Dent | 455/101 |
| 5,654,979 | 8/1997 | Levin et al. | 375/206 |
| 5,729,825 | 3/1998 | Kostreski et al. | 455/3.1 |
| 5,765,098 | 6/1998 | Bella | 455/13.3 |
| 5,832,389 | 11/1998 | Dent | 455/562 |

FOREIGN PATENT DOCUMENTS

| | | |
|---|---|---|
| 0715478 | 6/1996 | European Pat. Off. . |
| 9637975 | 11/1996 | WIPO . |
| 9638937 | 12/1996 | WIPO . |
| 9702666 | 1/1997 | WIPO . |

*Primary Examiner*—Hassan Kizou
*Assistant Examiner*—Mitchell Slavitt
*Attorney, Agent, or Firm*—Philip R. Wadsworth; Sean English; Roger W. Martin

[57] ABSTRACT

The present invention is a novel and improved method and apparatus for transmitting and receiving code division multiple access (CDMA) signals. In a described embodiment of the invention, the radio frequency (RF) signals are received through a first polarization RF unit and a second polarization RF unit generating right slant samples and left slant samples. The right slant samples and the left slant samples are each searched and multipath processed independently and the resulting sets of soft decision data combined and decoded. In a preferred embodiment of the invention, right slant and left slant instances of the signal are generated and transmitted to increase the likelihood of differently polarized instances of the signal being available at the receive system.

9 Claims, 6 Drawing Sheets

POLARIZATION ENHANCED CDMA COMMUNICATION SYSTEM

BACKGROUND OF THE INVENTION

I. Field of the Invention

The present invention relates to wireless telecommunications. More particularly, the present invention relates to a method and apparatus for utilizing the polarization of signals to facilitate the transmission and reception of signals processed using code division multiple access (CDMA) signals.

II. Description of the Related Art

Figure 1:
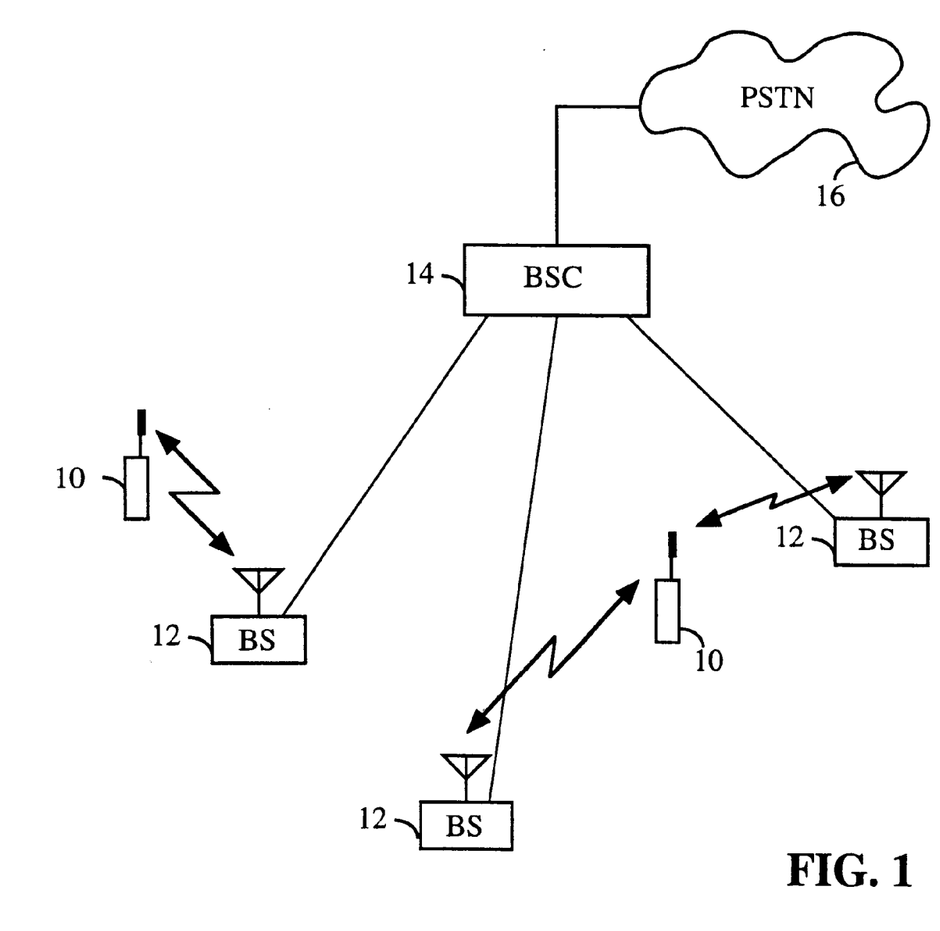
FIG. 1 is an illustration of a cellular telephone system configured in accordance with the use of the IS-95 standard.

The IS-95 standard (IS-95) defines a Code Division Multiple Access (CDMA) over-the-air interface for providing efficient and robust cellular telephone service. The IS-95 standard has been approved by the Telecommunication Industry Association (TIA) to allow cellular telephones and base stations manufactured by different suppliers to interoperate with one another. An illustration of a cellular telephone system configured in accordance with the use of the IS-95 standard is provided in FIG. 1. Also, a cellular telephone system configured substantially in accordance with the use of IS-95 is described in U.S. Pat. No. 5,103,459 entitled "System and Method for Generating Signal Waveforms in a CDMA Cellular Telephone System" assigned to the assignee of the present invention and incorporated herein by reference.

CDMA signal processing allows a set of user signals to be transmitted over the same radio frequency (RF) band by modulation of the user signals with a set of pseudorandom noise codes (PN codes) before up conversion to an RF frequency band. The PN codes are used to modulate and demodulate the user signals during transmission and reception processing respectively. The primary benefit of using CDMA signal processing is that adjacent base stations can use the same RF bandwidth to conduct communications, which increases the frequency reuse factor, and therefore the efficiency, with which the cellular telephone system uses the available RF bandwidth.

Another benefit of CDMA technology is that it allows multipath signal processing. Multipath signal processing is the individual processing of different copies of the same transmitted signal that are created by reflection and other multipath phenomenon. Typically, the various copies of the transmitted signal are processed by a set of demodulators, each synchronized with the state of the PN codes for that signal. During the processing of a particular multipath signal, the other unsynchronized multipath signal are detected as background noise or interference. Once each multipath signal is processed, the resulting "soft decision" data is typically combined into a single data set, and the single data set decoded.

While the use of multipath signal processing improves the performance of a CDMA receive processing system, the interference generated by the other multipath signals during the processing of a particular multipath signal is still undesirable. This interference can result in fading, and reduce the total number of communications that can be conducted by a particular base station. If a method and apparatus for reducing the degree to which the set multipath signals interfere with one another could be provided, the performance of multipath receive processing system could be improved still further. It is to this end, as well as other ends discussed below, that the present invention is directed.

SUMMARY OF THE INVENTION

The present invention is a novel and improved method and apparatus for utilizing the polarization of signals to facilitate the transmission and reception of signals processed using code division multiple access (CDMA) signals. In one embodiment of the invention, right slant and left slant version of the signal are transmitted using separate antennas to increase the likelihood of differently polarized versions of the signal being available at the receive system, and to reduce cross interference. Additionally, a delay is introduced into one transmission to provide additional diversity. The receive system is comprised of a single polarized antenna and a diversity receiver that selects the best instances of the signal received, which typically depends on the polarization of those signals and the orientation of the antenna. In another embodiment, the receive system incorporates two antenna having different polarization characteristics to increase the likelihood of higher quality versions of the signal being received.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention is a novel and improved method and apparatus for utilizing the polarization of signals to facilitate the transmission and reception of signals processed using code division multiple access (CDMA) signals. In the following description, the invention is set forth in the context of a CDMA cellular telephone system operating in accordance with the IS-95 standard. While the invention is especially suited for operation with a cellular telephone system operating in accordance with the IS-95 standard, other wireless communication systems including satellite based systems or point-to-point communication system may incorporate the use of the present invention, as may wireline systems that incorporate the use of sinusoidal signals and a rake receiver such as in coaxial cable based communication systems.

Figure 2:
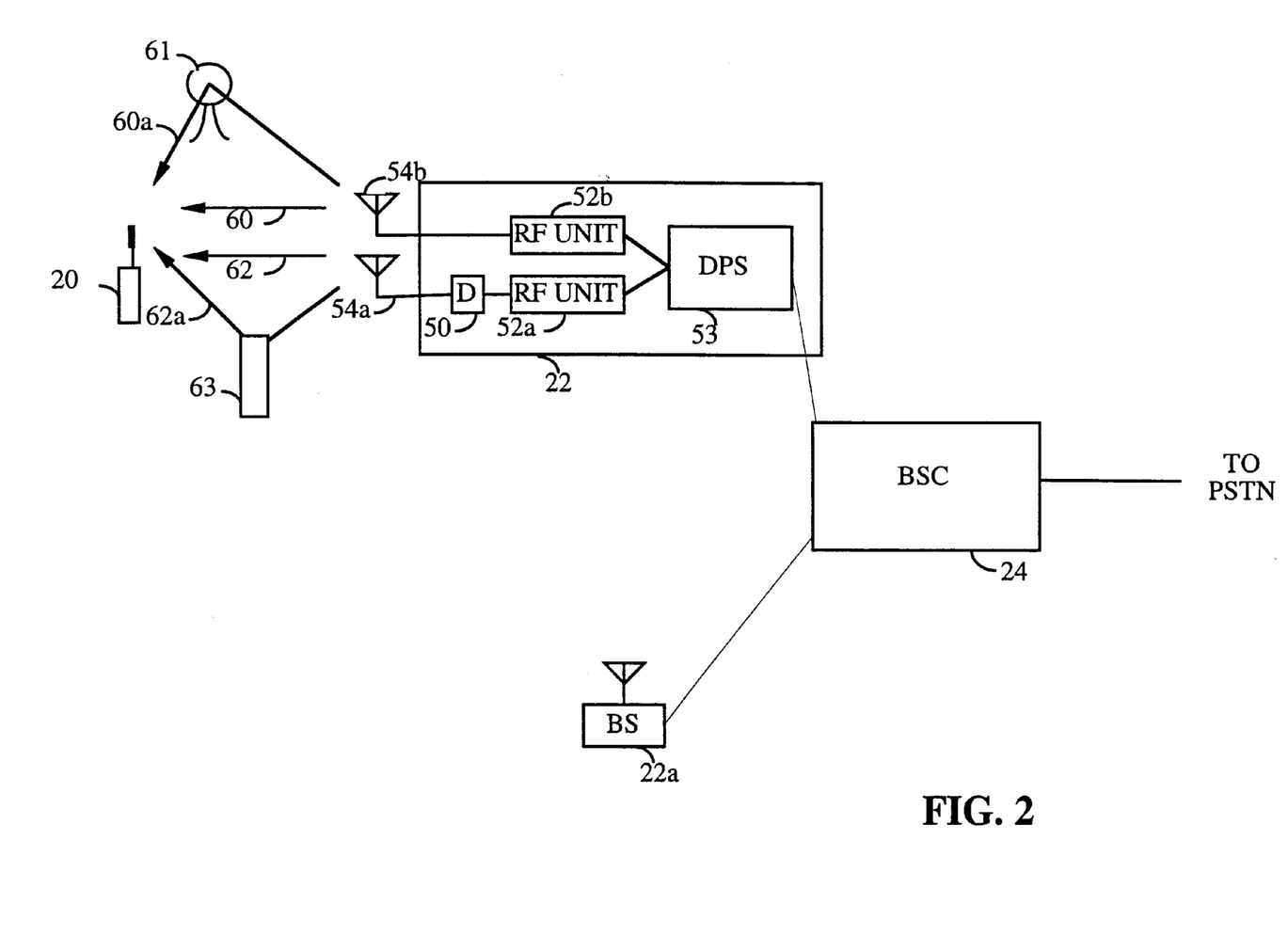
FIG. 2 is a block diagram of cellular telephone system configured in accordance with a first embodiment of the invention.

FIG. 2 is a highly simplified block diagram of a portion of cellular telephone system configured in accordance with one embodiment of the invention. Base stations 22 and 22a are coupled to base station controller 24, which is in turn coupled to the public switch telephone network (PSTN). PSTN is the conventional wireline telephone network. As shown base station 22 is transmitting an RF signal to a subscriber unit 20 in order to conduct communications. Typically, subscriber unit 20 transmits an RF signal to base station 22, however, this transmission is not shown to simplify discussion of the invention.

In a preferred embodiment of the invention, base station 22 generates two orthogonally polarized forward link signals referred to as right slant signal 60 and left slant signal 62 transmitted from antenna systems 54a and 54b. In the exemplary embodiment of the invention described herein, these signals are generated by two separate RF subsystems 52a and 52b which are part of base station 22 in response to digital signals received from digital processing system (DPS) 53. DPS 53 receives data to be transmitted from BSC 44.

Delay 50 is coupled to RF subsystem 52a. Delay 50 introduces a delay into the outbound left slant signal 62 in order to provide time diversity. The duration of the delay is at least as long as the duration of one bit, or "chip," from the PN codes used for modulation and demodulation, and preferably equal to the duration of 2–3 chips. Those skilled in the art will recognize various alternative methods for introducing delay into a signal including the introduction of delay in by DPS 53. However, it is preferable to introduce delay after the processing performed by DPS 53 as it is only necessary to generate one instance of the digital signal.

As is well known in the art, radio frequency signals can possess various type of orthogonal polarizations including left slant and right slant polarizations which are oriented at 45 degrees of vertical. Additionally, various other types of polarization are known including horizontal and vertical linear polarizations, or right hand circular (RHC) and left hand circular (LHC) polarizations the use of which is also consistent with the use of the present invention.

In one embodiment of the invention, preferably, right slant signal 60 and left slant signal 62 are transmitted with different directional orientations. For example, antenna 54a may be pointed in a slightly different direction than antenna 54b. Preferably the difference in the directional orientations should be slight, so that the two signals are received at the same location while experiencing different multipath conditions. This enhances the diversity of signal source. Alternatively, the orientations can altered more substantially. For example, subsystems 52a and 52b along with antennas 54a and 54b can be placed in a different locations. This would have the effect of creating different cells having differing polarizations. As subscriber unit 20 moved from one cell to the next the polarization of the signal received would change. Of course, the antennas may also have the same directional orientation.

As shown in FIG. 2, right slant signal 60 is reflected by tree 61 generating multipath signal 60a and left slant signal 62 is reflected by building 63 generating multipath signal 62a. As is well known in the art, reflection can modify an already polarized signal, or add polarization to a non-polarized signal. Subscriber unit 20 receives signals 60, 60a, 62 and 62a and performs receive demodulation to extract the data transmitted.

Figure 3:
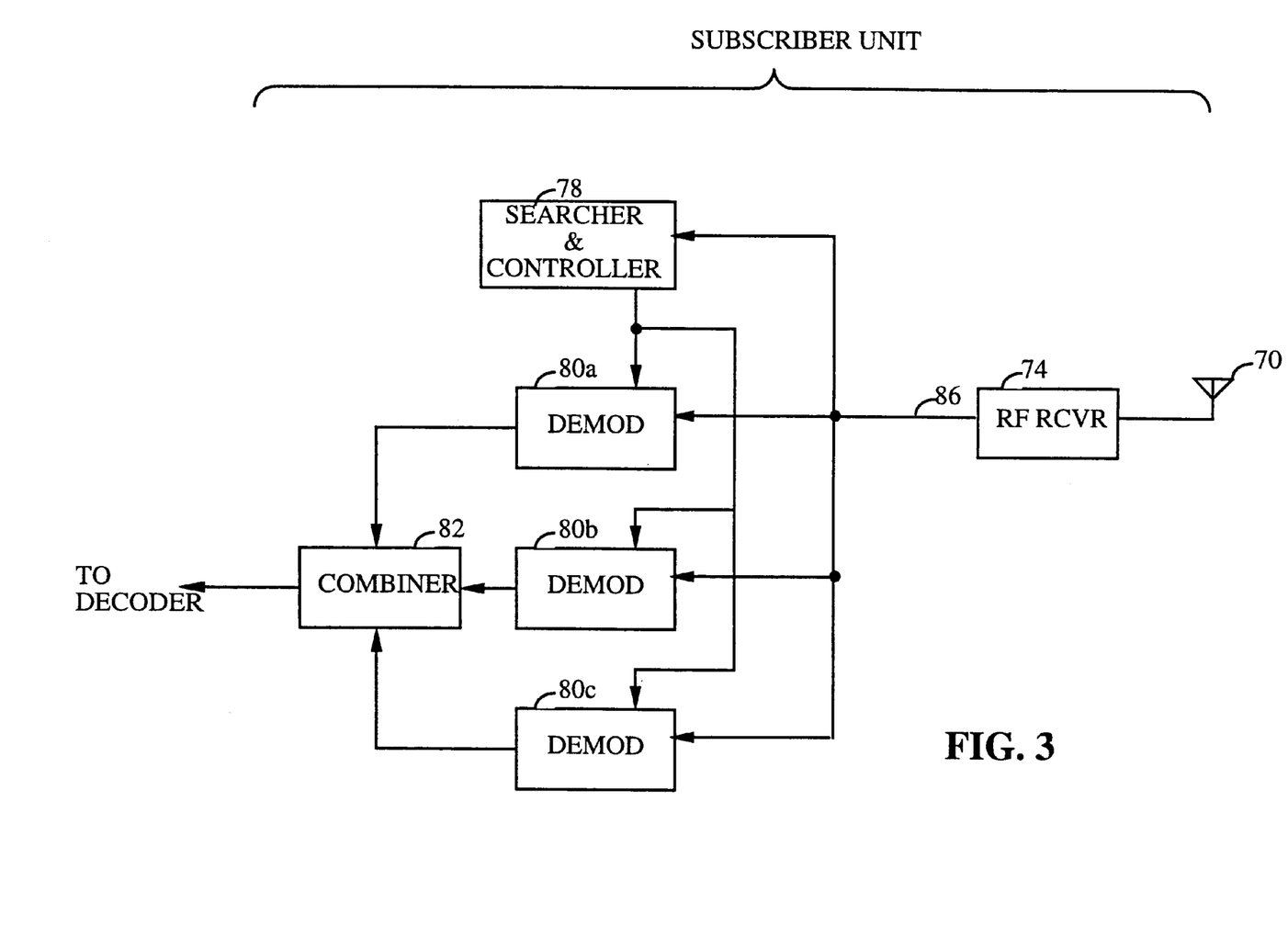
FIG. 3 is a block diagram of a receive processing system in a subscriber unit configured in accordance with a preferred embodiment of the invention.

FIG. 3 is a block diagram of the receive processing portion of subscriber unit 20 when configured in accordance with one embodiment of the invention. Antenna system 70 is coupled to RF receiver 74, which is in turn coupled to demodulators 80a–c and to searcher and controller 78. Demodulators 80a–c are also coupled to searcher and controller 78, as well as to combiner 82. While three demodulators 80 are shown, the use of other numbers of demodulators including four or more is consistent with the use of the present invention.

During operation, antenna system 70 receives the left slant and right slant RF signal from base station 22. The RF receiver filters, down converts digitizes those signals generating samples 86. Searcher and control system 78 receives samples 86 and performs repeated time offset searches using the PN codes used to modulate the signals to determine the arrival times of the signals 60, 60a, 62 and 62a of FIG. 2. Once the arrival times of signals 60, 60a, 62 and 62a are determined, searcher and control system 78 configures demodulators 80a–c to process a signal 60, 60a, 62 and 62a within either right slant samples 86 or left slant samples 86 at the associated arrival time using control interface.

In the preferred embodiment of the invention demodulators 80a–c demodulate the samples using a PN spreading code and a Walsh channel code configured and generated in accordance with the IS-95 standard and the associated arrival time (offset). Additionally, demodulators 80a–c perform time tracking to adjust for changes in the arrival time. The demodulation performed by demodulators 80a–c generates soft decision data received by combiner 82. Combiner 82 combines the soft decision data yielding summed soft decision data which is received by a decoder (not shown). The decoder performs soft decision decoding to generate hard decision data which is then made available for further processing such as data manipulation or regeneration of audio tones. Various types of decoding are known and may be incorporated into the present invention including trellis or Viterbi decoding.

By using differently polarized RF receivers the various signals received can be isolated from one another before demodulation and therefore the degree to which they interfere with one another is reduced. Typically, antenna system 70 will have a polarization reception characteristic due to its shape and orientation that will separate signals having different polarizations. As the orientation changes, the nature of the polarization reception will change as well providing signal diversity over time. This improves processing performance of subscriber unit 20 and thus enhances the call processing capability of an associated cellular telephone system. This enhanced call processing capability is typically used to increase the number of telephone calls that can be conducted at any given instant.

Figure 4:
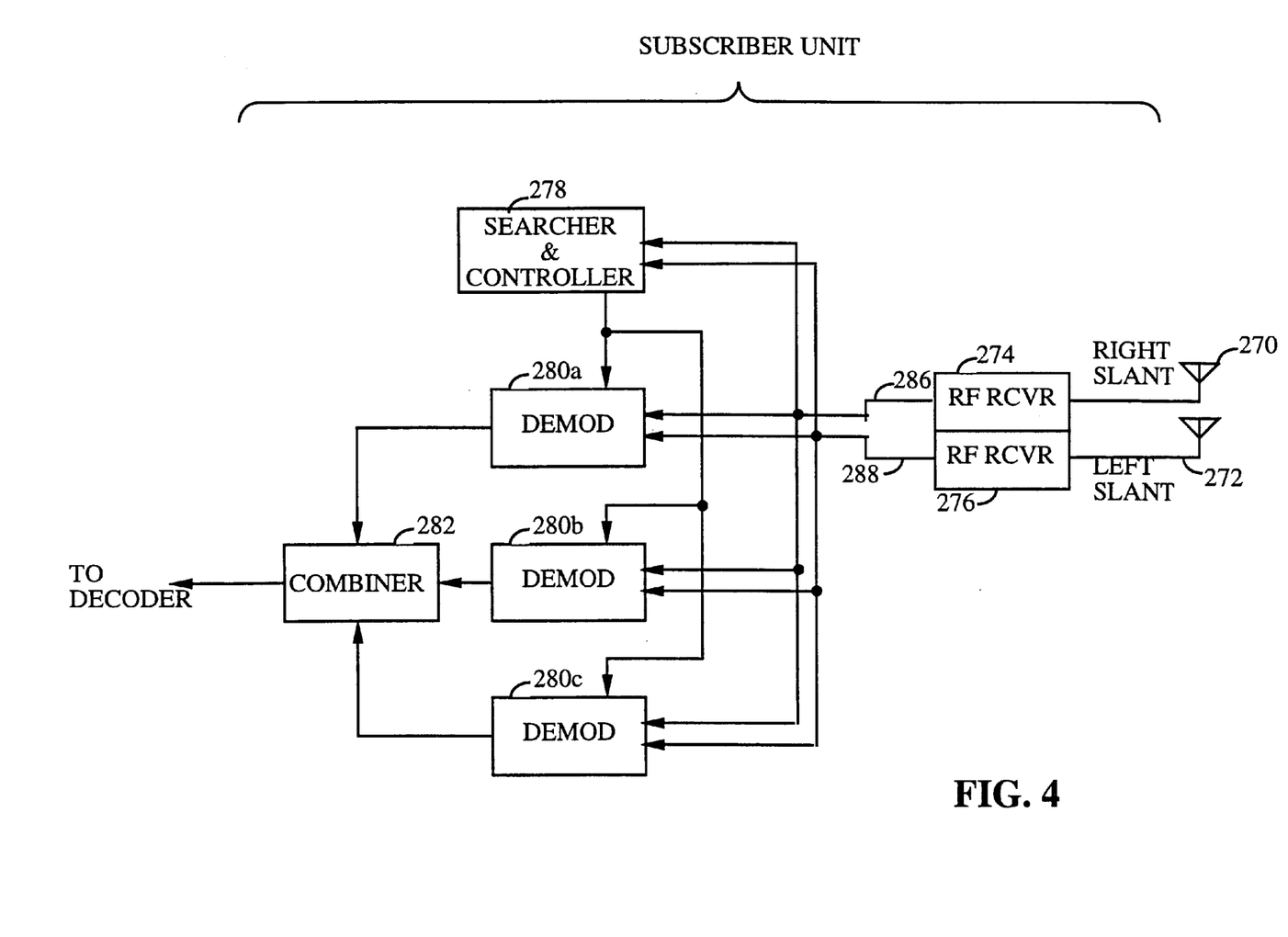
FIG. 4 is a block diagram of a subscriber unitcellular telephone system configured in accordance with another embodiment of the invention.

FIG. 4 is a block diagram of the receive processing portion of subscriber unit 20 when configured in accordance with another embodiment of the invention. Right slant antenna system 270 and left slant antenna system 272 receives RF signals that are provided to RF receivers 274 and 276. RF receivers 274 and 276 are coupled to demodulators 280a–c and to searcher and controller 278. Demodulators 280a–c are coupled to searcher and controller 278 and to combiner 282. While three demodulators 280 are shown, the use of other numbers of demodulators including four or more is consistent with the use of the present invention. While referred to as right slant and left slant antenna systems 270 and 272, the typical mobility of the subscriber unit will alter the absolute polarity of the antenna systems, but not the relative polarity.

During operation, right slant antenna system 270 receives signals with a right slant polarity and receiver 274 frequency filters, down converts and digitizes those signals generating right slant samples 286. Similarly, left slant antenna system 272 performs polarized filtration of the RF signals, and receiver 276 frequency filters, down converts and digitizes those signals generating left slant samples 288. Various method and antenna for performing polarized reception are well known in the art. Thus, right slant samples 286 contain only those signals that having a right slant component, and therefore the interference due to orthogonally polarized signals is removed. Similarly, left slant samples 288 contain only those signals having a left slant component, and therefore the interference from other orthogonally polarized signals is removed.

Searcher 278 receives right slant samples 286 and left slant samples 288 and performs repeated time offset searches using the PN codes use to modulate the signals to determine the arrival times of the signals 60, 60*a*, 62 and 62*a* of FIG. 2. Once the arrival times of signals 60, 60*a*, 62 and 62*a* are determined, searcher 278 configures demodulators 280*a*–*c* to process a signal 60, 60*a*, 62 and 62*a* within either right slant samples 286 or left slant samples 88 at the associated arrival time using a control interface. In the preferred embodiment of the invention demodulators 280*a*–*c* demodulate the samples using a PN spreading code and a Walsh channel code configured and generated in accordance with the IS-95 standard and the associated arrival time (offset). Additionally, demodulators 280*a*–*c* perform time tracking to adjust for changes in the arrival time.

The demodulation performed by demodulators 280*a*–*c* generates soft decision data received by combiner 282. Combiner 282 combines the soft decision data yielding summed soft decision data which is received by a decoder (not shown). The decoder perform soft decision decoding to generate hard decision data which is then made available for further processing such as data manipulation or regeneration of audio tones. Various types of decoding are known and may be incorporated into the present invention including trellis or Viterbi decoding.

By using differently polarized RF antennas the various signals received can be isolated from one another before demodulation and therefore the degree to which they interfere with one another is reduced. Additionally, by using two antenna with different polarizations the best available signal can be received, identified and processed independently, thus enhancing the average signal quality. This improves processing performance of subscriber unit 20, and thus enhances the call processing capability of an associated cellular telephone system. This enhanced call processing capability is typically used to increase the number of telephone calls that can be conducted at any given instant.

Figure 5:
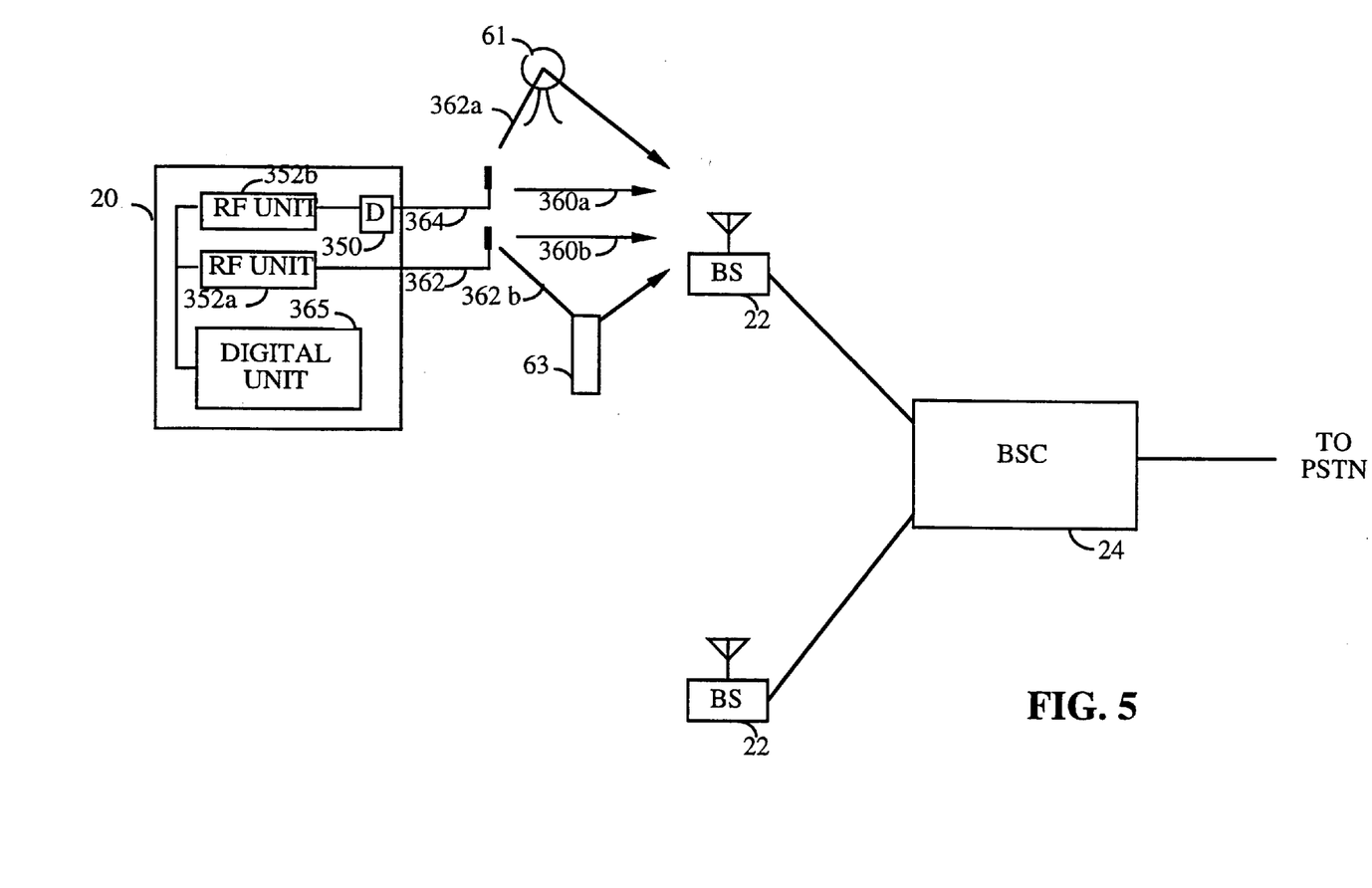
FIG. 5 is a block diagram of a portion of the transmit processing system of a subscriber unit when configured in accordance with one embodiment of the invention.

FIG. 5 is a highly simplified block diagram of a portion of cellular telephone system configured in accordance with another embodiment of the invention. Base stations 22 are coupled to base station controller 24, which is in turn coupled to the public switch telephone network (PSTN). PSTN is the conventional wireline telephone network. As shown subscriber unit 20 is transmitting an RF signal to a base station 22 in order to conduct communications.

Subscriber unit 20 generates two orthogonally polarized forward link signals referred to as right slant signal 360*a* and left slant signal 360*b* transmitted from antenna systems 362 and 364. These signals are generated by two separate antennas which are part of subscriber unit 20 in response to digital signals received from digital unit 365. The data is received from some external source such as digitized voice.

Delay 350 is coupled to RF unit 352*b*. Delay 350 introduces a delay into the outbound right slant signal 360*a* in order to provide time diversity. The duration of the delay is at least as long as the duration of one bit, or "chip," from the PN codes used for modulation and demodulation, and preferably equal to the duration of 2–3 chips. Those skilled in the art will recognize various alternative methods for introducing delay into a signal including the introduction of delay in by digital unit 353. However, it is preferable to introduce delay after the processing performed by digital unit 353 as it is only necessary to generate one instance of the digital signal.

As described above with reference to FIG. 2, right slant signal 360*a* and left slant signal 360*b* are transmitted with different directional orientations. For example, antenna 364 may be pointed in a slightly different direction than antenna 362. Preferably the difference in the directional orientations should be slight, so that the two signals are received at the same location while experiencing different multipath conditions. This enhances the diversity of signal source.

As shown in FIG. 5, the right slant signal from antenna 364 is reflected by tree 61 generating multipath signal 362*a* and the left slant signal from antenna 362 is reflected by building 63 generating multipath signal 362*b*. As is well known in the art, reflection can modify an already polarized signal, or add polarization to a non-polarized signal. Base station 22 receives signals 360*a*, 360*b*, 362*a*, and 362*b* and performs receive demodulation to extract the data transmitted. In one embodiment of the invention, base station 22 receives signals 360*a*, 360*b*, 362*a*, and 362*b* via an antenna system with a particular polarization which filters some of the resulting multipath.

Figure 6:
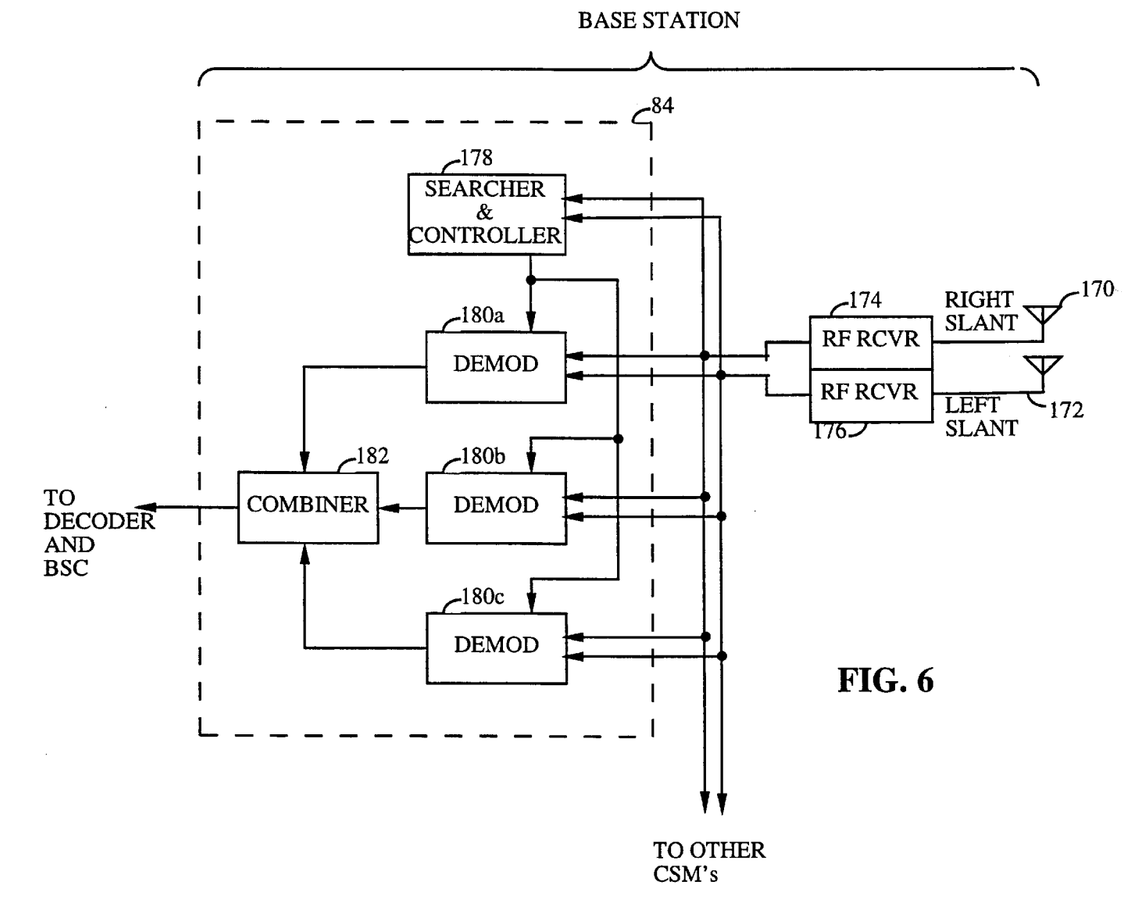
FIG. 6 is a block diagram of a portion of thea receive processing system in a base station configured in accordance with a preferred embodiment of the invention.

FIG. 6 is a block diagram of a portion of the receive processing system of a base station 22 when configured communicating with a subscriber unit 20 in accordance with still anotheran exemplary embodiment of the invention. Within base station 22 a cell site modem (CSM) 84 is shown coupled to an antenna system. The antenna system is comprised of right slant antenna 170 and left slant antenna 172 as well as RF receivers 174 and 176. Typically, the base station receives a set of signals such as signals 360*a*, 360*b*, 362*a* and 362*b* of FIG. 5. As shown, the base station receives three instances, or occurrences, of the RF signal transmitted from subscriber unit 20. One instance 360*a* or 360*b* is received via a direct path. Another instance 362*a* is reflected from tree 61. The third instance 362*b* is reflected from building 63. Additionally, other signals are transmitted from other subscriber units 20 and received by antennas 170 and 72.

Signals received by right slant antenna 170 are applied to receiver 174 which filters, downconverts and digitizes the delayed signals. Signals received by left slant antenna 172 are applied to receiver 176 which filters, downconverts and digitizes the signals. The digitized signals from receivers 174 and 176 are applied to cell site modem (CSM) 84 (shown only in part), as well as other cell site modems within the base station (not shown), which demodulates the set of multipath signals from a particular subscriber unit 20. A system and method for implementing each CSM on a single integrated circuit is described in U.S. Pat. No. 5,654,979 entitled "Cell Site Demodulator Architecture for a Spread Spectrum Multiple Access Communication System" and copending U.S. application Ser. No. 08/316,177 entitled "Multipath Search Processor For A Spread Spectrum Multiple Access Communication System," both assigned to the assignee of the present invention and incorporated by reference herein.

Within CSM 84 searcher and controller 178 receives the digitized signals and identifies multipath instances of the signal being processed by applying the associated spreading codes at various time offsets. Additionally, searcher and controller examines the input from antenna 170 and antenna 172 separately and determines which is producing the best result for a particular finger. Once multipath signals are identified, searcher and controller 178 assigns a demodulator 180 to process that multipath signal from the particular antenna determined to provide the best result. The resulting soft decision data from demodulators 180*a–c* are combined by combiner 182 and passed to a trellis or Viterbi decoder and then on to the BSC.

By providing RF signals of different polarity at a transmit system, the present invention enhances the receive processing of the multipath signals at the receive systemreceived from a particular subscriber unit 20. In particular, reflection and other phenomenon that cause multipath transmission often alter polarization of the signal, including the introduction of non-uniform polarization. By providing polarized antenna inputs, differently polarized multipath instances of the signals are filtered from one another, and therefore do not interfere with one another. The introduction of delay further prevents interference by decreasing the likelihood that the signals will combined destructively and therefore cause a fade condition.

Thus, the present invention is a novel and improved method and apparatus for transmitting and receiving code division multiple access (CDMA) signals. The previous description of the preferred embodiment is provided to enable any person skilled in the art to make or use the present invention. The various modifications to these embodiments will be readily apparent to those skilled in the art, and the generic principles defined herein may be applied to other embodiments without the use of the inventive faculty. In particular, while a preferred configuration of a base station controller is used to illustrate one embodiment of the invention, the present invention may be implemented using alternatively configured base station controllers. Thus, the present invention is not intended to be limited to the embodiments shown herein but is to be accorded the widest scope consistent with the principles and novel features disclosed herein.

I claim:

1. A method for transmitting a signal via a code division multiple access communication system comprising:
   a) transmitting a first polarized version of said signal from a first antenna; and
   b) transmitting a second polarized version of said signal from a second antenna;
      wherein said first polarized version of said signal is transmitted with a different polarization and a different directional orientation than said second polarized version of said signal.

2. The method as set forth in claim 1 wherein said first polarized version is orthogonal to said second polarized version.

3. The method as set forth in claim 1 wherein said first polarized version of said signal is at a different time offset than said second polarized version of said signal.

4. A system for receiving a signal received via a set of multipath copies comprising:
   a first polarized reception system for generating a first polarized set of said multipath copies in response to said set of multipath copies;
   a second polarized reception system for generating a second polarized set of said multipath copies in response to said set of multipath copies; and
   a first demodulation system for generating first soft decision data in response to said first polarized set of multipath copes and said second polarized set of multipath copes; and
   a second demodulation system for generating second soft decision data in response to said first polarized set of multipath copes and said second polarized set of multipath copes.

5. The system as set forth in claim 4 further comprising a searcher for identifying the time offset of particular multipath copies in said first polarized set of multipath copes and said second polarized set of multipath copies.

6. The system as set forth in claim 5 wherein said searcher is further for configuring said first demodulation system and said second demodulation system to modulate either said first polarized set of multipath copes or said second polarized set of multipath copes.

7. A system for transmitting a code division multiple access signal comprising:
   a first radio frequency processing unit for transmitting a first polarized version of said signal via a first antenna; and
   a second radio frequency processing unit for transmitting a second polarized version of said signal via a second antenna;
   wherein said first polarized version of said signal is transmitted with a different polarization and a different directional orientation than said second polarized version of said signal.

8. The system as set forth in claim 7 wherein said first polarized version is orthogonal to said second polarized version.

9. The system as set forth in claim 7 wherein
   said first radio frequency processing unit transmits said a first polarized version of said signal with a first time offset; and
   said second radio frequency processing unit transmits said a second polarized version of said signal with a second time offset that is different from said first time offset.

* * * * *